(12) United States Patent
Mees

(10) Patent No.: US 9,147,435 B2
(45) Date of Patent: Sep. 29, 2015

(54) WEIGHTED PLAYLIST

(75) Inventor: James Donald Mees, San Diego, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

(21) Appl. No.: 13/156,448

(22) Filed: Jun. 9, 2011

(65) Prior Publication Data

US 2012/0315012 A1    Dec. 13, 2012

(51) Int. Cl.
*H04N 9/80* (2006.01)
*G11B 27/10* (2006.01)
*H04N 5/76* (2006.01)
*H04N 9/82* (2006.01)

(52) U.S. Cl.
CPC ............... *G11B 27/105* (2013.01); *H04N 5/76* (2013.01); *H04N 9/8205* (2013.01)

(58) Field of Classification Search
CPC ... H04N 9/8042; G11B 27/329; G11B 27/034
See application file for complete search history.

(56) References Cited

U.S. PATENT DOCUMENTS

| | | | |
|---|---|---|---|
| 6,898,159 B2 | 5/2005 | Kudo | |
| 6,987,221 B2 | 1/2006 | Platt | |
| 7,196,258 B2 | 3/2007 | Platt | |
| 7,227,073 B2 | 6/2007 | Kim | |
| 7,526,181 B2 | 4/2009 | Burges et al. | |
| 7,580,932 B2 | 8/2009 | Plastina et al. | |
| 7,653,761 B2 | 1/2010 | Juster et al. | |
| 7,707,609 B2 | 4/2010 | O'Donnell et al. | |
| 7,788,586 B2 | 8/2010 | Brownell | |
| 7,962,488 B2 | 6/2011 | Kudo | |
| 8,001,472 B2 | 8/2011 | Gilley et al. | |
| 8,027,977 B2 | 9/2011 | Thambiratnam | |
| 8,065,703 B2 | 11/2011 | Wilson | |
| 8,560,950 B2 * | 10/2013 | Bull et al. | 715/716 |
| 2006/0212478 A1 * | 9/2006 | Plastina et al. | 707/104.1 |
| 2009/0327222 A1 * | 12/2009 | Spitzer-Williams et al. | 707/3 |
| 2010/0023144 A1 * | 1/2010 | Waites | 700/94 |

* cited by examiner

*Primary Examiner* — William C Vaughn, Jr.
*Assistant Examiner* — Daniel Tekle
(74) *Attorney, Agent, or Firm* — Lewis Roca Rothgerber LLP

(57) ABSTRACT

The playback of content from a playlist is disclosed. A user may influence the probability of a specific item from a content playlist being selected during the execution of a pseudo-random (shuffle) algorithm.

16 Claims, 3 Drawing Sheets

WEIGHTED PLAYLIST

BACKGROUND OF THE INVENTION

1. Field of the Invention

The present invention generally concerns the playback of audio and/or video content selections (hereinafter 'content') from a playlist. More specifically, the present invention concerns user influence on the probability of a specific item from a content playlist being selected during the execution of a pseudo-random (shuffle) algorithm.

2. Description of the Related Art

Many consumer electronics devices such as digital audio players, mobile devices with content playback capability, and even laptop or desktop computing devices with a content player or application support the implementation of a playlist. In the most general form, a playlist is a list of content that can be played in a sequential or shuffled order. In the latter case, content is played back in a pseudo-random order.

While there are numerous instances of pseudo-random selection algorithms, such algorithms generally fall into one or two distinct categories. The first such category includes those algorithms where subsequent selections of content made by the execution of the algorithm are independent of content previously selected through execution of the algorithm. The second such category includes those algorithms where previous content selections are excluded from further playback until the entire playlist has been processed. In the first category, a given piece of content may be randomly selected multiple times while another piece of content may not be selected for playback at all. In the second category, every item of content on the playlist is played back before any one item is played again.

In many instances, a playlist inevitably includes content that is no longer desired by a user of the consumer electronics device. Such a lack of desire to hear further playback of the content may be permanent such that the user never desires to hear the particular selection or any selection by a particular group ever again. Such a lack of desire may also be temporary. For example, a user may simply not be in the mood to hear a particular selection at any given time. In many instances, a user may be more interested in hearing one type of content selection to the detriment of another.

Removing a particular selection from a playlist can often be time consuming in that it requires 'synching' a mobile device to a host computer that manages playlist generation and modification and, further, that hosts all content owned by a user and that may be included on a playlist. Further, if the lack of interest in a particular content selection is temporary, removing a selection from a playlist can be even more laborious if it need be reintroduced at a later time.

There is a need in the art for a user to weight or rank playlist items whereby content may be randomly played back but more or less so than other items in the playlist.

SUMMARY OF THE CLAIMED INVENTION

A method for implementing a weighted play list is claimed. Through the method, a play list is accessed. The play list includes a sequence of content selections. A first content selection is weighted by virtue of a rating assigned to the first content selection by the user. The playlist is modified based on the weighted first content selection. Modifying the play list includes deleting the weighted first content selection from the play list, adding the weighted first content selection to the play list when the weighted first content selection was not previously included in the sequence of content selections, or changing the propensity for the weighted first content selection to be repeatedly selected from the playlist during playback. The modified playlist is then used to identify individual pieces of content for playback.

A second method for implementing a weighted play list is claimed. Through the method, a play list is accessed. The play list includes a sequence of content selections. A first content selection is weighted by virtue of a user action associated with the first content selection. The playlist is modified based on the weighted first content selection. Modifying the play list includes deleting the weighted first content selection from the play list, adding the weighted first content selection to the play list when the weighted first content selection was not previously included in the sequence of content selections, or changing the propensity for the weighted first content selection to be repeatedly selected from the playlist during playback. The modified playlist is then used to identify individual pieces of content for playback.

A third method for implementing a weighted play list is claimed. Through the method, a play list is accessed. The play list includes a sequence of content selections. A first content selection is weighted by virtue of both a rating assigned to the first content selection and a user action associated with the first content selection. The playlist is modified based on the weighted first content selection. Modifying the play list includes deleting the weighted first content selection from the play list, adding the weighted first content selection to the play list when the weighted first content selection was not previously included in the sequence of content selections, or changing the propensity for the weighted first content selection to be repeatedly selected from the playlist during playback. The modified playlist is then used to identify individual pieces of content for playback.

DETAILED DESCRIPTION

Embodiments of the present invention concern weighting a playlist in the context of pseudo-random (shuffle) algorithms in a consumer electronics device allowing for the playback of content in accordance with a shuffled playlist. The weighting of content selections for subsequent shuffling of the playlist may be accomplished through a user interface associated with the consumer electronics device. The user interface allows the user to customize behavior and processing of content by the consumer electronics device as well as display the results of any user influence.

The present disclosure generally references a consumer electronics device. Such devices are inclusive of digital audio players, mobile devices with content playback capability, and laptop or desktop computing devices with a content player or application support the implementation of a playlist. Such devices include memory for storing content as well as a processor or series of processors for accessing, retrieving, and rendering that stored content via an audio and/or video interface (e.g., a speaker, audio output jack, and/or video display). Content may be stored on the device by way of download of content from a content server over a wireless connection. Content may also be stored on the device as the result of a wired coupling as might occur through a USB cable and 'synching' with another computing device storing a larger library of content (e.g., synching a digital audio player with a home computer and its associated content library).

Also stored on the consumer electronics device is a playlist. The playlist may be generated at the device itself or on another computing device capable of generating and subsequently transferring the playlist to the consumer electronics device. The playlist is not the content itself, but rather a list of files names and/or song titles with the appropriate markers that allow for the consumer electronics device to access, retrieve, and render the actual content stored in memory when the corresponding file name or song title is queued on the playlist. The playlist may be shuffled in accordance with a stored algorithm executed by a processor and generally described in the related art and, further, as weighted in accordance with an embodiment of the present invention. Instructions for rendering a user interface and processing user input to weight a playlist and received by way of the interface are likewise stored in memory and executable by a processor or series of the same.

Figure 1:
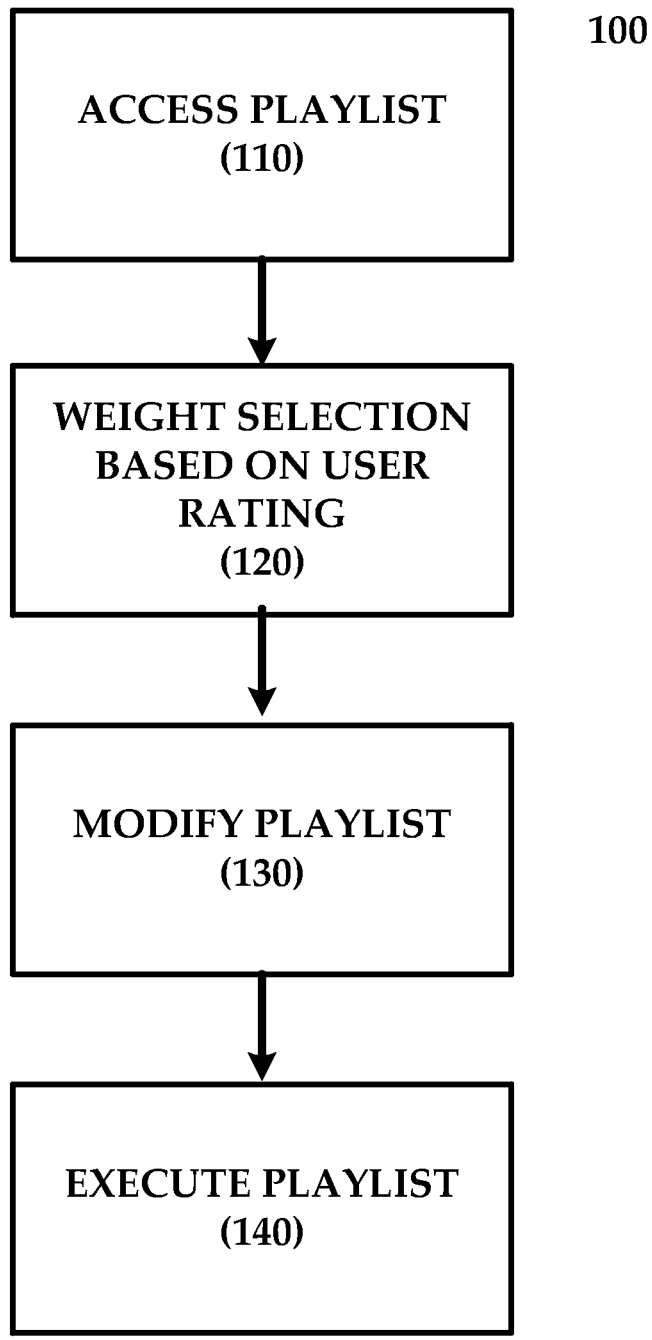
FIG. 1 is a method for implementing a weighted playlist whereby a first content selection is weighted by virtue of a user rating assigned to the first content selection.

FIG. 1 is a method 100 for implementing a weighted playlist whereby a first content selection is weighted by virtue of a user rating assigned to the first content selection.

In step 110 of the method 100, a play list is accessed. The play list is stored in memory of a consumer electronic device such as a digital audio/video player, a gaming device, or a mobile device such as a smart phone having audio/video playback capabilities.

In step 120, a first content selection in the play list is weighted. The content selection may be weighted based on a user rating. The user rating may have been received through a user interface on the consumer electronic device. The content selection may be audio related (e.g., a song) or content having an audio and video component. Video only content may also be a part of the playlist. As previously noted, the playlist need not be the actual content files, but rather markers, references, or tags to the actual content file that is eventually rendered during playback.

The assigned rating may include an overall rating of the content selection. The assigned rating may also or alternatively include a rating of a segment of the content selection. That rating may be assigned by the user during previous playback of the content selection.

In step 130, the play list is modified based on the weighted content selection. Modification of the playlist may include deletion of content from the playlist. Modification of the playlist may also or alternatively include adding the content selection to a playlist in those instances where the weighted content was not previously a part of the playlist sequence. Modification may also or alternatively include changing the propensity for the content selection to be repeatedly selected from the playlist during playback. For example, the particular selection may occur more or less frequently during a playback operation.

The playlist is then executed in step 140 such that content selections are rendered as a part of a playback operation. Rendering of content may occur as a result of the playlist being processed and then the actual content being retrieved and executed from memory as a result of the information reflected in the playlist. The playlist itself is not the content being executed. The weighting and modification steps may occur as the result of instructions stored in memory of the consumer electronics device being executed by a processor.

The sequence of the content selections in the playlist may have originally been generated as the result of a randomization routine. In other instances, however, the sequence of content selections may have originally been generated by a user. The user may generate this order through interactions with the aforementioned user interface or some other computing device that may interact with the consumer electronics device. For example, a user might provide the order through interactions with an application executing at a desktop computer. That computer may subsequently communicate with the electronics device over a communications bus such as a USB cable and provide the manually generated playlist.

Figure 2:
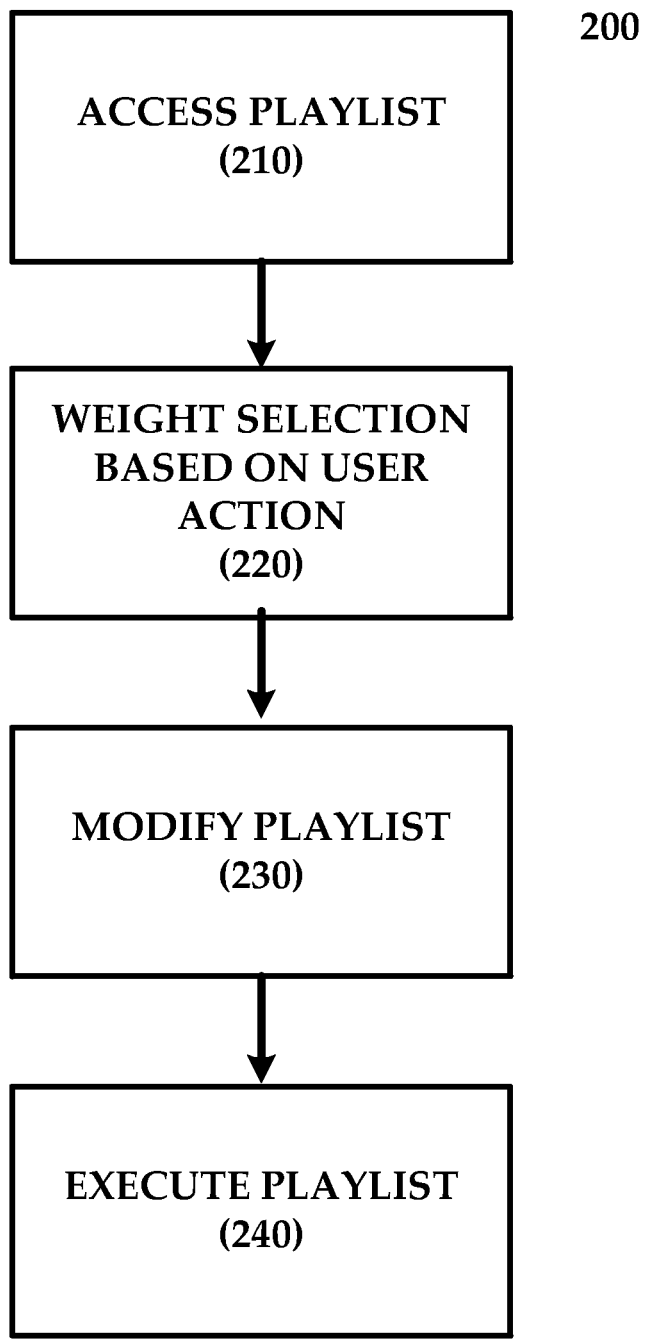
FIG. 2 is a method for implementing a weighted playlist whereby a first content selection is weighted by virtue of a user action associated with the first content selection.

FIG. 2 is a method 200 for implementing a weighted playlist whereby a first content selection is weighted by virtue of a user action associated with the first content selection.

In step 210 of method 200, a play list stored in memory of a consumer electronics device is accessed. The accessed play list includes a sequence of content selections. Like the method of FIG. 1, the play list may be stored in memory of a consumer electronics device such as a digital audio/video player, a gaming device, or a mobile device such as a smart phone having audio/video playback capabilities. Also like the method of FIG. 1, the content selection may be audio related or content having an audio and video component. Video only content may also be a part of the playlist. The sequence of content selections may be randomly generated. The sequence of content selections may also be generated by a user.

In step 220 of the method, as a result of executing instructions stored in memory of the consumer electronics device, a first content selection in the play list is weighted based on a user action associated with the first content selection. That user action is received through a user interface. The user action associated with the first content selection may include skipping the content selection during playback. The user action associated with the first content selection may also or alternatively include seeking a segment of the content selection during playback. The user action associated with the first content selection may also or alternatively include repeating a segment of the content selection during playback. The user action associated with the first content selection may also or alternatively include allowing the content selection to play from beginning to end without user interruption.

In step 230, the play list is modified based on the weighted first content selection. The playlist is modified as a result of executing instructions stored in memory of the consumer electronics device. Modifying the play list may include deleting the weighted first content selection from the play list. Modifying the playlist may also or alternatively include adding the weighted first content selection to the play list when the weighted first content selection was not previously included in the sequence of content selections. Modifying the playlist may include changing the propensity for the weighted first content selection to be repeatedly selected from the playlist during playback (e.g., more or less often).

The content is then rendered in step 240. Rendering of the content occurs in accordance with the modified playlist. Rendering of content may occur as a result of the playlist being processed and then the actual content being retrieved and executed from memory as a result of the information reflected in the playlist. The playlist itself is not the content being executed. The weighting and modification steps may occur as the result of instructions stored in memory of the consumer electronics device being executed by a processor.

Figure 3:
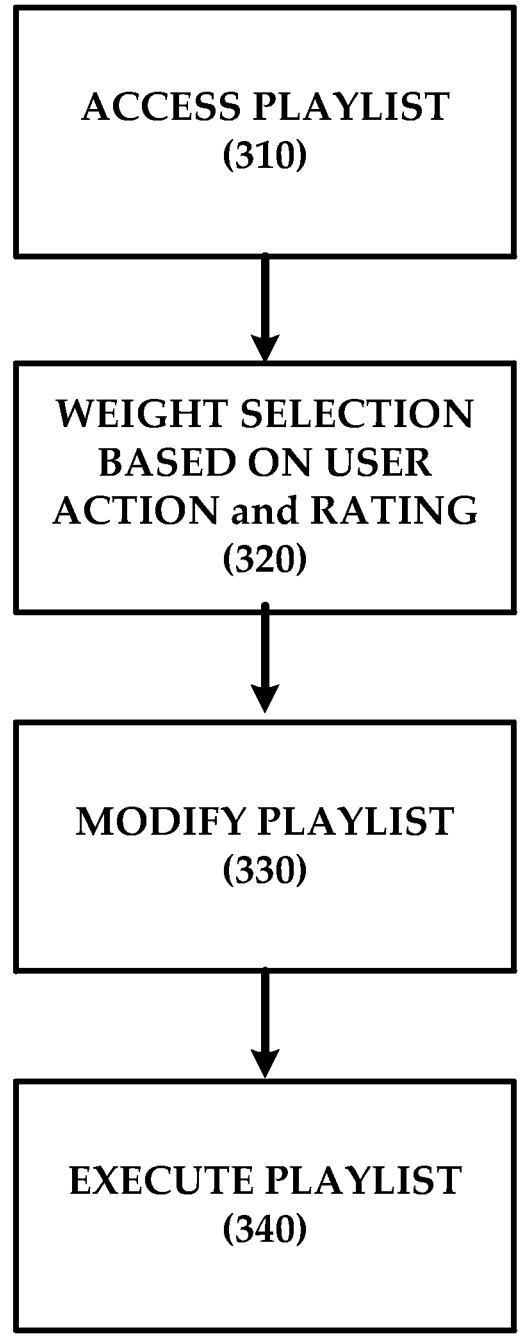
FIG. 3 is a method for implementing a weighted playlist whereby a first content selection is weighted by virtue of both a user rating assigned to the first content selection and a user action associated with the first content selection.

FIG. 3 300 is a method 300 for implementing a weighted playlist whereby a first content selection is weighted by virtue of both a user rating assigned to the first content selection and a user action associated with the first content selection.

In the method 300 of FIG. 3, a play list stored in memory of the consumer electronics device is accessed at step 310. The play list including a sequence of content selections.

As a result of executing instructions stored in memory of the consumer electronics device, a processor (at step 320) weights a first content selection in the play list based on both a user action associated with the first content selection and a rating assigned by the user to the first content selection. The user action and the rating assigned by the user may both be received through a user interface.

The assigned rating may include an overall rating of the content selection. The assigned rating may also or alternatively include a rating of a segment of the content selection. The rating may be assigned by the user during previous playback of the content selection.

The user action associated with the first content selection may include skipping the content selection during playback. The user action may also or alternatively include seeking a segment of the content selection during playback. The user action may also or alternatively include repeating a segment of the content selection during playback. The user action may also or alternatively include allowing the content selection to play from beginning to end without user interruption.

At step 330, the play list is modified based on the weighted first content selection. Modification of the play list occurs as a result of instructions stored in memory of the device being executed by a processor. Modifying the play list may include deleting the weighted first content selection from the play list. Modifying the playlist may also or alternatively include adding the weighted first content selection to the play list when the weighted first content selection was not previously included in the sequence of content selections. Modifying the playlist may also or alternatively include changing the propensity for the weighted first content selection to be repeatedly selected from the playlist during playback (e.g., more or less often).

At step 340, content selections in accordance with the modified playlist during playback. Rendering of the content occurs in accordance with the modified playlist. Rendering of content may occur as a result of the playlist being processed and then the actual content being retrieved and executed from memory as a result of the information reflected in the playlist. The playlist itself is not the content being executed. The weighting and modification steps may occur as the result of instructions stored in memory of the consumer electronics device being executed by a processor.

The above described methodologies of FIGS. 1, 2, and 3 may also be implemented in the context of a non-transitory computer-readable storage medium. As a result of executing of the instructions by a processor (or series of processors), the various steps of said methodologies may be effectuated.

What is claimed is:

1. A method for creating a weighted audio content playlist on a consumer electronics device, the method comprising:
accessing a playlist stored in memory of a consumer electronics device associated with a user, the playlist including a sequence of individual audio content selections;
initiating execution of the playlist, wherein execution of the playlist includes beginning playback of a first audio content selection in the playlist; and
executing instructions stored in memory of the consumer electronics device, wherein execution of the instructions by a processor:
weights the first audio content selection, wherein weighting the first audio content selection includes automatically:
decreasing the propensity for the first audio content selection to be repeatedly selected from the playlist during subsequent execution of the playlist when both:
the first audio content selection plays from beginning to end without user interruption, wherein user interruption includes the receipt of an input command from the user during playback of the first audio content selection that pauses the playback of the first audio content, skips a segment of the first audio content, or repeats a segment of the first audio content, and
the first audio content selection was not previously weighted by an affirmative user rating received from the user; and
increasing the propensity for the first audio content selection to be repeatedly selected from the playlist during subsequent execution of the playlist when both:
the first audio content selection plays from beginning to end without user interruption, wherein user interruption includes the receipt of an input command from the user during playback of the first audio content selection that pauses the playback of the first audio content, skips a segment of the first audio content, or repeats a segment of the first audio content, and
the first audio content selection was previously weighted by an affirmative user rating received from the user; and
modifies the playlist based on the weighted first audio content selection.

2. The method of claim 1, wherein the sequence of audio content selections were generated randomly.

3. The method of claim 1, wherein the sequence of audio content selections were generated by a user.

4. The method of claim 1, wherein the audio content selection is a song.

5. The method of claim 1, wherein the audio content selection is accompanied by a video.

6. The method of claim 1, wherein modifying the playlist includes deleting the weighted first audio content selection from the playlist.

7. The method of claim 1, wherein the affirmative user rating includes an overall rating of the first audio content selection.

8. The method of claim 1, wherein the affirmative user rating includes a rating of a segment of the first audio content selection, the rating received from the user during previous playback of the first audio content selection.

9. A method for creating a weighted audio content playlist on a consumer electronics device, the method comprising:
accessing a playlist stored in memory of a consumer electronics device associated with a user, the playlist including a sequence of individual audio content selections;
initiating execution of the playlist, wherein execution of the playlist includes beginning playback of a first audio content selection in the playlist; and
executing instructions stored in memory of the consumer electronics device, wherein execution of the instructions by a processor:
weights the first audio content selection, wherein weighting the first audio content selection includes automatically:

decreasing the propensity for the first audio content selection to be repeatedly selected from the playlist during subsequent execution of the playlist when both:
    the first audio content selection plays from beginning to end without user interruption greater than a predetermined number of instances, wherein user interruption includes the receipt of an input command from the user during playback of the first audio content selection that pauses the playback of the first audio content, skips a segment of the first audio content, or repeats a segment of the first audio content, and
    the first audio content selection was not previously weighted by an affirmative user rating received from the user; and
increasing the propensity for the first audio content selection to be repeatedly selected from the playlist during subsequent execution of the playlist when both:
    the first audio content selection plays from beginning to end without user interruption greater than a predetermined number of instances, wherein user interruption includes the receipt of an input command from the user during playback of the first audio content selection that pauses the playback of the first audio content, skips a segment of the first audio content, or repeats a segment of the first audio content, and
    the first audio content selection was previously weighted by an affirmative user rating received from the user; and
modifies the playlist based on the weighted first audio content selection.

10. The method of claim 9, wherein modifying the playlist includes deleting the weighted first audio content selection from the playlist.

11. The method of claim 9, wherein the affirmative user rating includes an overall rating of the first audio content selection.

12. The method of claim 9, wherein the affirmative user rating includes a rating of a segment of the first audio content selection, the rating received from the user during previous playback of the first audio content selection.

13. The method of claim 9, wherein the sequence of audio content selections were generated randomly.

14. The method of claim 9, wherein the sequence of audio content selections were generated by a user.

15. The method of claim 9, wherein the audio content selection is a song.

16. The method of claim 9, wherein the audio content selection is accompanied by a video.

\* \* \* \* \*